United States Patent
Liang et al.

(10) Patent No.: US 8,438,430 B2
(45) Date of Patent: May 7, 2013

(54) RESOURCE MANAGEMENT SYSTEM AND APPARATUS

(75) Inventors: Xiaojun Liang, Cupertino, CA (US); Rajit Kambo, Saratoga, CA (US)

(73) Assignee: VMware, Inc., Palo Alto, CA (US)

(*) Notice: Subject to any disclaimer, the term of this patent is extended or adjusted under 35 U.S.C. 154(b) by 1202 days.

(21) Appl. No.: 12/196,073

(22) Filed: Aug. 21, 2008

(65) Prior Publication Data
US 2010/0050171 A1 Feb. 25, 2010

(51) Int. Cl.
*G06F 11/00* (2006.01)

(52) U.S. Cl.
USPC .......... 714/704; 718/102; 370/232; 370/332; 370/335

(58) Field of Classification Search ............ 422/62; 370/332, 335; 718/105
See application file for complete search history.

(56) References Cited

U.S. PATENT DOCUMENTS

| | | | |
|---|---|---|---|
| 5,121,467 A * | 6/1992 | Skeirik ........................... | 706/10 |
| 5,142,612 A * | 8/1992 | Skeirik ........................... | 706/23 |
| 5,367,523 A * | 11/1994 | Chang et al. .................. | 370/235 |
| 5,408,586 A * | 4/1995 | Skeirik ........................... | 706/25 |
| 6,055,524 A * | 4/2000 | Cheng ............................. | 706/23 |
| 6,317,637 B1 * | 11/2001 | Limroth ......................... | 700/42 |
| 6,549,517 B1 * | 4/2003 | Aweya et al. ............. | 370/236.1 |
| 2006/0045802 A1 * | 3/2006 | Boyden et al. .................. | 422/62 |
| 2006/0209693 A1 * | 9/2006 | Davari et al. .................. | 370/232 |
| 2006/0236324 A1 * | 10/2006 | Gissel et al. .................. | 718/105 |
| 2009/0024253 A1 * | 1/2009 | Nath et al. .................... | 700/281 |

OTHER PUBLICATIONS

Li, "A coarative design and Tuning for conventional fuzzy control", Oct. 1997, IEEE, pp. 884-889.*
Silva, "New results on the synthesis of PID controller", Feb. 2002, IEEE, pp. 241-252.*
Diao, "Managing web server performance with autotune agents", 2003, IBM, pp. 136-149.*
Zhao, "Fuzzy gain scheduling of PID controller", Oct. 1993, IEEE, pp. 1392-1398.*
Abelzaher, "Feedback performance control in sorfware services", Jun. 2003, IEEE, pp. 74-90.*
Chen, "Back-propagation neural networks for non-linear self-tuning adaptive control", 1990, IEEE, pp. 44-48.*

* cited by examiner

*Primary Examiner* — Scott Baderman
*Assistant Examiner* — Jeison C Arcos

(57) ABSTRACT

A computer implemented method for efficiently allocating resources for an enterprise server system through a proportional integral derivative scheme is provided. The method includes defining a set point parameter for a resource being allocated and defining a proportional gain parameter, a proportional integral (PI) gain parameter and a proportional integral derivative (PID) gain parameter in terms of the proportional gain parameter. The method further includes calculating an initial maximum allocation for the resource based on a product of the proportional gain parameter with a difference of an initial operating parameter and the set point parameter and adjusting the initial operating parameter to the initial maximum allocation. A next allocation of the resource is calculated based on a product of the proportional gain parameter with the difference of an initial operating parameter and the set point parameter and a difference of the set point with a current operating parameter. The initial maximum allocation is adjusted with a next allocation.

16 Claims, 8 Drawing Sheets

RESOURCE MANAGEMENT SYSTEM AND APPARATUS

BACKGROUND

The computing industry has seen many advances in recent years, and such advances have produced a multitude of products and services. Computing systems have also seen many changes, including their virtualization. Virtualization of computer resources generally connotes the abstraction of computer hardware, which essentially separates operating systems and applications from direct correlation to specific hardware. Hardware is therefore abstracted to enable multiple operating systems and applications to access parts of the hardware, defining a seamless virtual machine. The result of virtualization is that hardware is more efficiently utilized and leveraged.

The advent of virtualization has sparked a number of technologies, which allow companies to optimize the utilization of their systems. As a company's enterprise systems are usually installed at various geographic locations, networking protocols are used to interconnect the various systems, which can then be virtualized into one or more virtual servers.

Resource management of the system has become increasingly important, especially with regard to the updates and patches regularly run for the system. Currently, the hardware capacity for the numerous enterprise systems is not considered in providing an update. That is, a conservative approach is generally taken where a fixed number of updates is specified, irrespective of the capacity of the hardware resources available. In addition, there is no feedback during the update process as the updates are provided through an open loop system. Consequently, the update process cannot be tuned during the process in order to react to changes in resource availability. These changes can impact the performance as the systems are providing real application performance during the update.

In view of the foregoing, there is a need for methods, systems and computer implemented processes that provide for more efficient update techniques for an enterprise system.

SUMMARY

In one embodiment, a computer implemented method for allocating resources among servers of a system is provided. The method includes specifying a proportional gain parameter at a first time interval and determining a first control error at the first time interval. Allocating a resource of the enterprise system corresponding to a product of the proportional gain parameter and the first control error and determining an integral gain parameter at a second time interval are included in the method. A second control error is determined at the second time interval. A control output considering a product of the proportional gain parameter and the first control error, and a product of the proportional gain parameter and the second control error is determined. The resource allocation is adjusted based on the control output and a third control error is determined at a third time interval. The resource allocation is adjusted based on another control output considering the third control error. In one embodiment, the method operations are stored as program instructions on computer readable medium.

In another embodiment, a computer implemented method for efficiently allocating resources for an enterprise server system through an proportional integral derivative scheme is provided. The method includes defining a set point parameter for a resource being allocated and defining a proportional gain parameter, an integral gain parameter and a derivative gain parameter. The integral gain parameter and the derivative gain parameter are defined in terms of the proportional gain parameter. The method further includes calculating an initial maximum allocation for the resource based on a product of the proportional gain parameter with a difference of an initial operating parameter and the set point parameter. A control variable is adjusted to the initial maximum allocation. A next allocation of the resource based on a product of the proportional gain parameter with a difference of an initial operating parameter and the set point parameter, and a difference of the set point with a current operating parameter is calculated. The initial maximum allocation is adjusted to the next allocation. In one embodiment, the method operations are stored as program instructions on computer readable medium.

Other aspects of the invention will become apparent from the following detailed description, taken in conjunction with the accompanying drawings, illustrating by way of example the principles of the invention.

DETAILED DESCRIPTION

Figure 1:
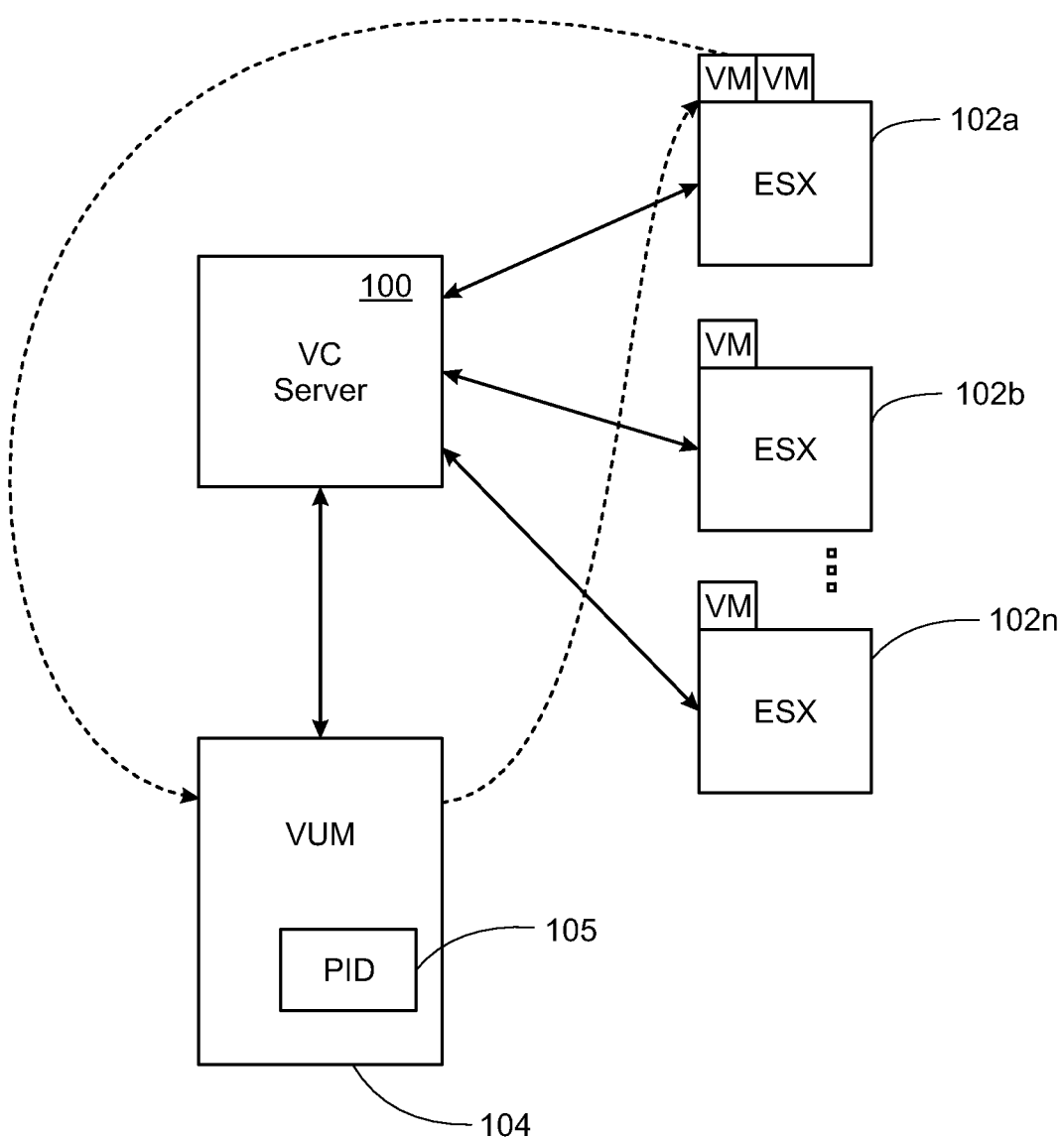
FIG. 1 is a high level schematic diagram of an exemplary system in which the Proportional Integral Derivative (PID) control technique may be employed in accordance with one embodiment of the invention.

Broadly speaking, the embodiments of the present invention provide methods and computer implemented systems that enable the efficient utilization of resources for the maintenance operations for an enterprise system. In one embodiment, the system includes a feedback mechanism to enable the self tuning of the maintenance process as the availability of resources changes during the maintenance process. The following description provides numerous specific details set forth in order to provide a thorough understanding of the present invention. It will be apparent, however, to one skilled in the art that the present invention may be practiced without some or all of these specific details. Operations may be done in different orders, and in other instances, well known process operations have not been described in detail in order not to unnecessarily obscure the present invention. Several exemplary embodiments of the invention will now be described in detail with reference to the accompanying drawings.

Currently the update manager for enterprise systems, such as the VMWARE™ update system, utilizes a resource management control that is an open loop system. Basically, whenever a task is scheduled, the projected resource consumption is computed. A resource management policy is enforced to see if this task can be initiated instantly or needs to hold in a waiting queue until the resource management requirement is satisfied. This technique applies to both the VMWARE UPDATE MANAGER™ (VUM) server host and VMWARE ESX™ host as a VUM task would probably impact these two hosts in terms of resources. It should be appreciated that the actual deployment varies in terms of the hardware capacity and the how the hardware is used. In one embodiment, the system may be busy with other applications running at the same time, e.g., the VMWARE CONVERTER™ might run at the same time as the VUM server and VIRTUALCENTER (VC) server. It should be appreciated that while specific system architectures are provided when describing the embodiments contained herein, these architectures are not meant to be limiting. That is, the closed loop feedback control described below may be integrated into any system requiring the management of resources during updates or upgrades, irrespective of whether the system is involved with virtualization.

With respect to enterprise system, such as the systems where the products of the assignee are employed, data center administrators need to run batch upgrade operations regularly. For example, every few months WINDOWS critical patches need to be installed to all virtual machines in a data center. When these operations run, they consume resources such as the central processing unit (CPU), memory, and network resources on both the ESX host and the VC host. This task becomes difficult to manage because administrators want the tests to be done within a maintenance window, however, the resources need to be reserved so that real application performance will not be affected by the batch operations. In order to ease the management of this task, as well as updates to any other enterprise system, a closed loop Proportional-Integral-Derivative (PID) control technique is described in more detail below.

The PID algorithm has many forms. The classic version can be described as:

$$u(t) = K_c \left[ e(t) + \frac{1}{T_i} \int_0^t e(t) dt + T_d \frac{de(t)}{dt} \right] \quad (1)$$

where
u is the control variable (also referred to as a control output) as in FIG. 1;
e is the control error; $e=y_{sp}-y$, where $y_{sp}$ is the set point and y is the actual operating parameter or process variable;
$K_c$ is the proportional gain;
$T_i$ is the integral time;
$T_d$ is the derivative time;

The PID algorithm has three terms. "P" means proportional control. The problem with proportional control is that the steady state error is always nonzero. The integral term "I" contributes output that is proportional to the time integral of the error, which gets rid of the steady state error. The derivative term "D" is proportional to the time derivative of the control error. The derivative term predicts the future error and thus reduces the time to get into steady state. As equation (1) shows, there are three parameters for a PID controller besides the sampling time interval. They are the proportional gain, the integral time and the derivative time.

In DDC (direct digital control) system, all signal processing is done at discrete instances of time. Equation (1) is modified with sampling techniques as follows:

$$\int_0^t e(t) dt \approx T_0 \sum_{i=0}^{k} e(i) \quad (2)$$

$$\frac{de(t)}{dt} \approx \frac{e(k) - e(k-1)}{T_0}$$

where $T_0$ is the sampling interval. From (1) and (2):

$$u(k) = Kc \left\{ e(k) + \frac{T_0}{T_i} \sum_{i=0}^{k} e(i) + \frac{T_d}{T_0} [e(k) - e(k-1)] \right\} \quad (3)$$

or $$u(k) = K_c e(k) + K_i \sum_{i=0}^{k} e(i) + K_d [e(k) - e(k-1)] \quad (4)$$

where
$K_c$ is the proportional gain;

$K_i = \frac{K_c T_0}{T_i}$ is the integral gain;

$K_d = \frac{K_c T_d}{T_0}$ is the derivative gain;

From (3) or (4):

$$\Delta u(k) = u(k) - u(k-1) \quad (5)$$

$$= K_c \left\{ [e(k) - e(k-1)] + \frac{T_0}{T_i} e(k) + \frac{T_d}{T_0} [e(k) - 2e(k-1) + e(k-2)] \right\}$$

or $$\Delta u(k) = K_c [e(k) - e(k-1)] + K_i e(k) + K_d [e(k) - 2e(k-1) + e(k-2)] \quad (6)$$

In equation (4), (5) and (6), there are three parameters for the discrete form of PID control. They are the proportional gain, the integral gain and the derivative gain. According to equation (5) and (6), there are 4 parameters to be tuned for a PID controller. The four parameters include the sampling time interval, the proportional gain, the integral gain and the derivative gain. Although there are many techniques for tuning a PID controller, it is still an art to tune these parameters. The simplified tuning method used for purposes herein is:

$$T_o=0.1T_{cr}, T_i=0.5T_{cr}, T_d=0.125T_{cr} \quad (7)$$

where $T_{cr}$ is the ultimate period of the oscillation.

Applying equation (8) to equation (5), yields the following:

$$\Delta u(k)=K_c[2.45e(k)-3.5e(k-1)+1.25e(k-2)] \quad (8)$$

Equation (8) has only one parameter and thus easy to be used for tuning the PID controller of benchmark tools or any other specific application for the embodiments described herein. In order to reduce the settling time (the time it takes for the process output to die to between, say +/− 5% of set point) and remain stable, self-tuning PID techniques have been used. In one embodiment, the $K_c$ value of equation (8) and the sampling time interval would change by the PID controller itself with a set of rules. For different benchmark tools, or server resource allocation, the sample time interval value depends on the delay character of the testing system or server, respectively.

FIG. 1 is a high level schematic diagram of an exemplary system in which the PID control technique may be employed in accordance with one embodiment of the invention. VC server 100 is in communication with a plurality of ESX servers 102a through 102n. Each ESX server 102a through 102n is associated with a corresponding plurality of virtual machines (VM). VUM 104 employs a PID technique described further below to manage the resources during the updates for each of the virtual machines. One skilled in the art will appreciate that VUM PID module 105 may sit within VC server 100 in one embodiment. In other embodiments, VUM PID module 105 may be a stand-alone system or incorporated into another server or computing device within the system of FIG. 1. As mentioned above, the specific architecture of the system is not limiting to the embodiments described herein. The embodiments of the PID control technique and system may be integrated into any enterprise system and architecture, as the exemplary architecture of FIG. 1 is provided for an illustrative frame of reference.

Figure 2:
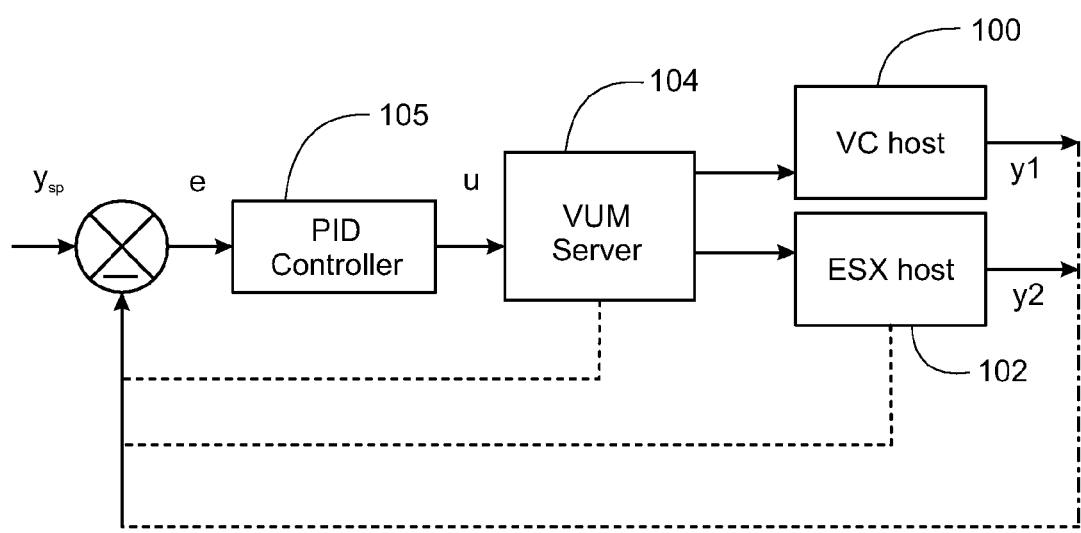
FIG. 2 is a simplified schematic diagram illustrating a high level overview of the PID control technique for a server providing updates to an enterprise system in accordance with one embodiment of the invention.

FIG. 2 is a simplified schematic diagram illustrating a high level overview of the PID control technique for a server providing updates to an enterprise system in accordance with one embodiment of the invention. In FIG. 2, PID controller 105 communicates with VUM server 104. VUM server 104 controls updates ESX host 102 and virtual machines running on ESX host 102. VUM server 104, as well as VC host 100 and ESX host 102, provide feedback to PID controller 105 as described herein. In the example discussed below, ESX host central processing unit (CPU) consumption is used to illustrate how the PID control is used with the embodiments described herein. It should be appreciated that while a single control target example is provided for the example, this is not limiting. One skilled in the art will appreciate that the embodiments described herein may be utilized with multiple control targets. In FIG. 2, $y_{sp}$ is the maximum allowed CPU busy percent for the ESX hosts, y is the real-time CPU busy percent number for the ESX hosts, e(k) is equal to $y_{sp}-y(k)$ which represents the control error at step k, and u(k) represents the maximum allowed outstanding tasks.

In one exemplary embodiment a data center administrator may decide to apply the latest WINDOWS patches to their 5000 WINDOWS virtual machines. The maintenance window is two hours but even during the maintenance window resources still need to be reserved for real applications that might be running during the maintenance window. Thus, a set point value of 60% is used. This set point represents that the data center administrator desires VUM 104 to run a maximum number of concurrent jobs so that the batch operations can be done quickly but there is still 40% CPU resources guaranteed for applications running at the same time.

To calculate the control error:

$$e(k)=0.6-y(k) \tag{9}$$

where y(k) is the CPU consumption at the "k"th time interval.

The PID controller is designed with the following parameter.

$K_c=20$

When applying the above values to equation 8, the following equation results:

$$\Delta u(k)=49e(k)-70e(k-1)+25e(k-2) \tag{10}$$

Equation 10 illustrates that a full PID controller requires two previous control error history data are needed. However, a controller providing only proportional control (P controller) does not require any historical data and can be used for initialization of the process. Similarly, a controller providing proportional and integral control (PI controller) requires only one step back of data (also referred to as a single previous time frame) and can be utilized subsequent to the P controller, upon initialization. It should be noted that in Eqn. 10, both of the integral gain parameter, the derivative gain parameter are defined in terms of the proportional gain parameter. Thus the equation is simplified down to a single variable. The mathematical representation of the proportional (P) and proportional integral (PI) controllers are provided below.

For P controller, $$\Delta u(k)=20e(k) \tag{11}$$

For PI controller, $$u(t) = K_c\left[e(t) + \frac{1}{T_i}\int_0^t e(t)dt\right] \tag{12}$$

Apply equation (2) to equation (12):

$$u(k) = Kc\left\{e(k) + \frac{T_0}{T_i}\sum_{i=0}^k e(i)\right\} \tag{13}$$

or:

$$u(k) = K_c e(k) + K_i \sum_{i=0}^k e(i) \tag{14}$$

where
$K_c$ is the proportional gain;

$K_i = \dfrac{K_c T_0}{T_i}$ is the integral gain;

From (13) or (14):

$$\Delta u(k) = u(k) - u(k-1) \tag{15}$$
$$= K_c\left\{[e(k) - e(k-1)] + \frac{T_0}{T_i}e(k)\right\}$$

or $$\Delta u(k) = K_c[e(k) - e(k-1)] + K_i e(k) \tag{16}$$

Apply equation (7) and $K_c=20$ to equation (16):

$$\Delta u(k)=24e(k)-20e(k-1) \tag{17}$$

It should be appreciated that these two controllers are especially useful as the arrive time for each VUM task could be completely random in the exemplary architecture of FIG. 1. For these random tasks, the P and PI controller could be used as the history data might be missing for PID controller. With reference to equations 10, 11, and 17, the following example illustrates the implementation of the above described functionality for the PID controller. One skilled in the art will appreciated that the PID controller 105 may be configured as three separate modules, i.e., P, PI, and PID modules, in one embodiment.

P controller: K=1, and y(1)=0 representing that CPU of the server being updated, e.g., the ESX host, is completely idle.

As there is no history data at this point, a P controller is used. According to equation 11:

$$u(1)=20*e(1)=20*(0.6-0)=12$$

Accordingly, the first 12 jobs are scheduled to run right away. The next job will be scheduled when one of the 12 previous jobs is done.

PI controller: K=2, and y(2)=0.3 meaning the server being updated, e.g., the ESX host, is 30% CPU busy because of the 12 tasks concurrently on this host. Since there is only one previous history data point, a PI Controller is used, according to equation (17):

$$u(2)=u(1)+24*(0.6-0.3)-20*(0.6-0)=7.2\approx 7$$

So the maximum allowed jobs will be adjusted to be 7 from 12 at the second time interval.

PID controller: K=3, let us say y(3)=0.2 meaning the server being updated, e.g., ESX host, is 20% CPU busy because we have reduced the maximum allowed tasks on this host from 12 to 7. Since the previous two steps' history data are available, a PID controller is used. According to equation 10:

$$u(3)=u(2)+49*(0.6-0.2)-70*(0.6-0.3)+25*(0.6-0)=\\7.2+19.6-21+15=20.8\approx 21$$

Consequently, the maximum allowed jobs is adjusted to 21 from 7 at the third time interval.

The equations presented above illustrate the process for the PID controller as jobs are scheduled during the maintenance window. It should be appreciated that a tuned PID controller, will converge and stabilize the CPU percent at 60%. It should be further appreciated that if there is some system noise added, such as a user starting to run a heavy load application on the server being updated, e.g., the ESX host, the PID controller will adjust the control variable, which is the maximum allowed concurrent jobs dynamically and adaptively.

Figure 3:
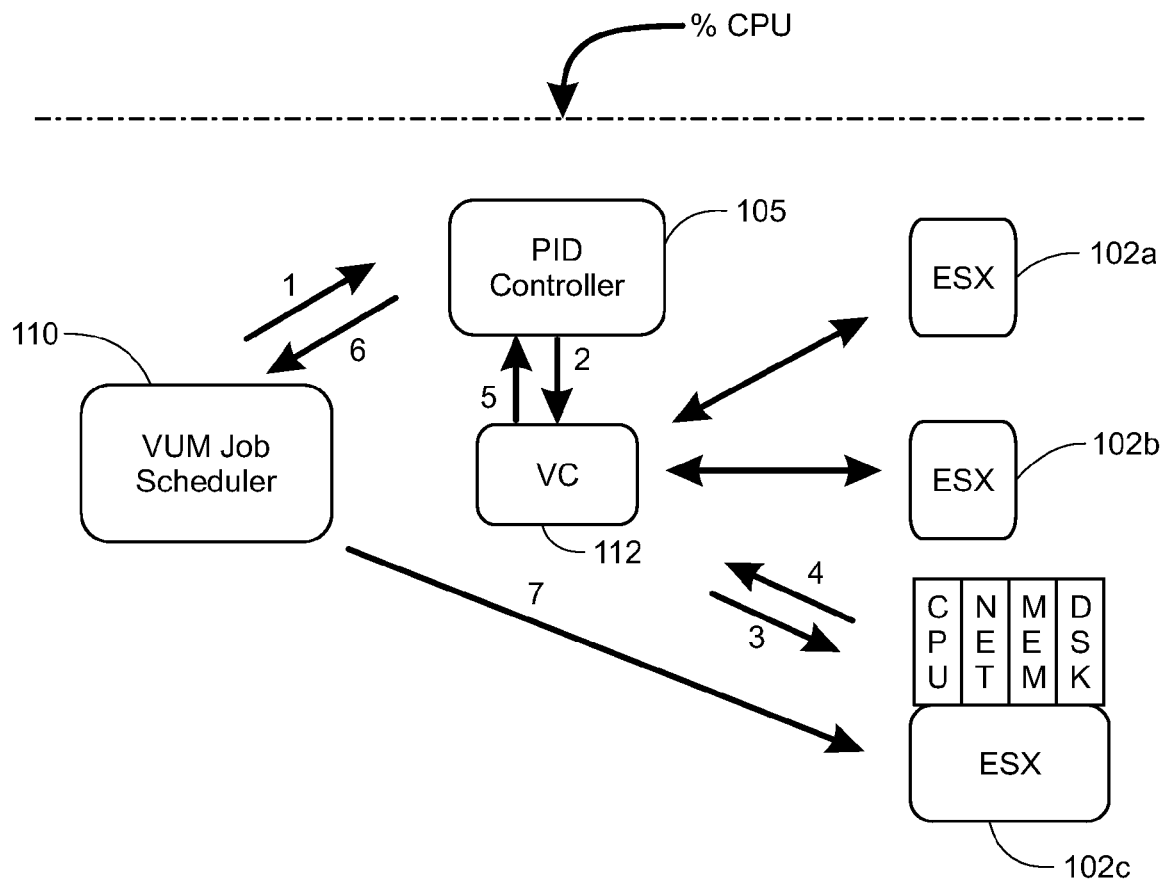
FIG. 3 is a high level schematic diagram illustrating the job scheduling framework within the PID controller in accordance with one embodiment of the invention.

FIG. 3 is a high level schematic diagram illustrating the job scheduling framework within the PID controller in accordance with one embodiment of the invention. Update Manager job scheduler 110, which may be incorporated into Update Manager 104 of FIGS. 1 and 2, communicates with PID controller 105. In one embodiment, Update Manager job scheduler 110 queries PID controller 105 for a maximum number of allowed concurrent jobs. In response to being queried, PID controller 105 queries central server 112 for the current CPU busy percent number of one of the enterprise hosts 102a through 102c. With respect to host 102c, server 112 samples the resource counters of host 102c every 20 second interval in one embodiment. As illustrated in FIG. 3, other resources besides CPU busy percent include memory availability, network bandwidth and disk capacity. The data sampled during these intervals is sent back to PID controller 105. PID controller 105 performs the calculation according to the embodiments described herein and provides the control variable value to Update Manager job scheduler 110. Update Manager job scheduler 110 then provides the task to execute on host 102c. One skilled in the art will appreciate that the modules described herein may be integrated into the products owned by the Assignee. For example Update Manager job scheduler 110 may be a VUM, server 112 may be a VC server and hosts 102a-c may be the ESX host.

Figure 4:
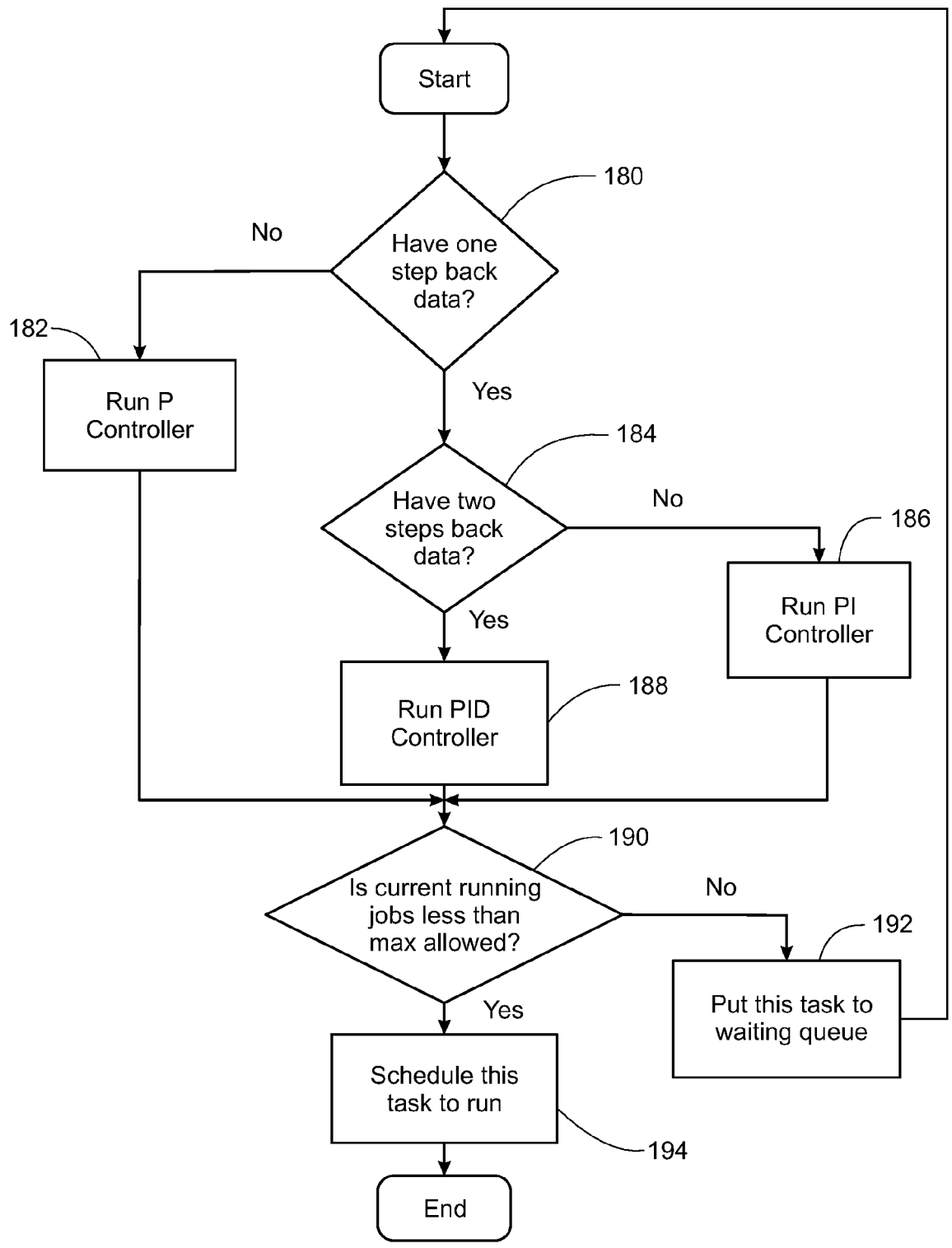
FIG. 4 is a simplified schematic diagram illustrating the job scheduler control flow in accordance with one embodiment of the invention.

FIG. 4 is a simplified schematic diagram illustrating the job scheduler control flow in accordance with one embodiment of the invention. The method of FIG. 4 initiates with decision operation 180 where it is determined if data from one step back, or the previous time interval, is available. If data is not available for one step back, then the PID controller is run with just proportional control in operation 182. If it is determined in operation 180 that data from one step back is available, the method proceeds to decision operation 184 where it is determined if data from two steps back is available. If data from two steps back or two successive previous time intervals is not available in operation 184, then the method advances to operation 186 where the proportional and integral portions of the PID controller are run. In operation 184, if it is determined that data from two steps back is available, the method proceeds to operation 188 where the full proportional integral derivative controller is run according to the embodiments described herein. From operations 182, 186 and 188, the method proceeds to decision operation 190 where it is determined if the current running jobs are less than a maximum allowed. If in decision operation 190 the current running jobs are not less than the maximum allowed, then the task is put into a waiting queue as represented by operation 192 and the method returns to operation 180. If, in operation 190, the current running jobs are less than the maximum allowed, the method moves to operation 194 where this task is scheduled to run.

Figure 5:
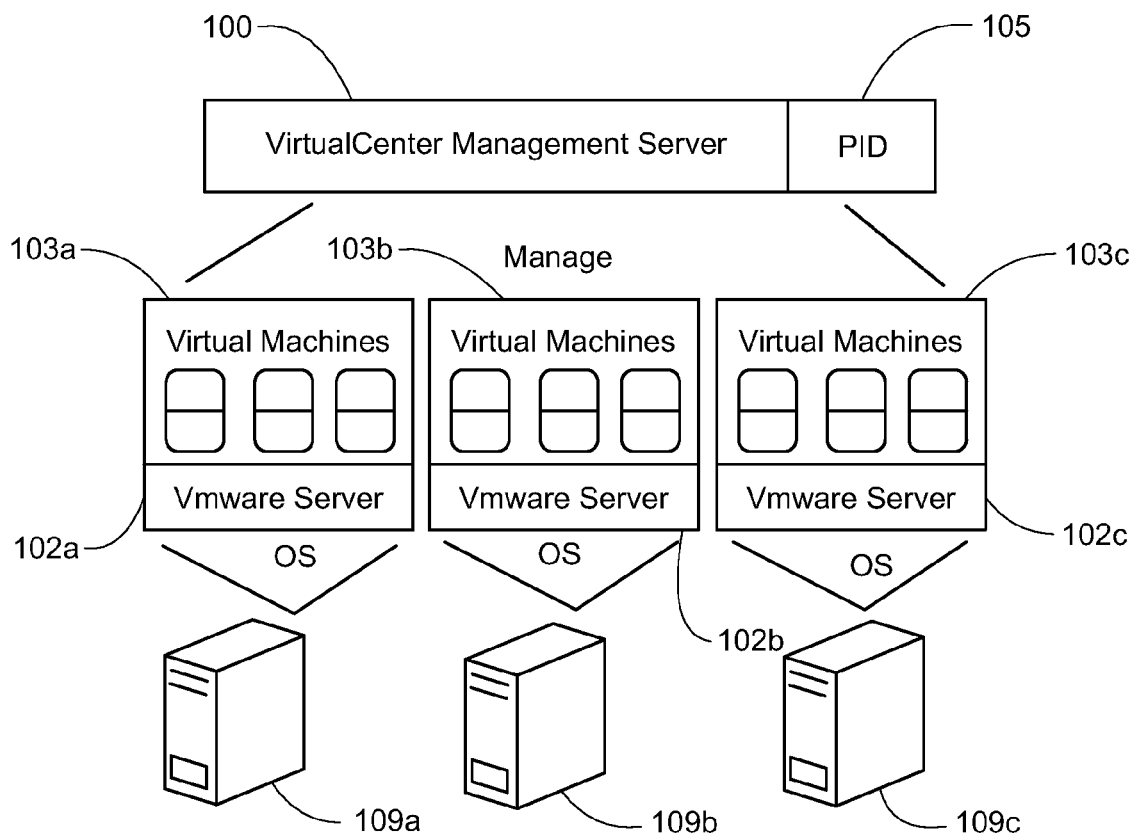
FIG. 5 is a simplified schematic diagram illustrating the employment of the PID control for a server in accordance with one embodiment of the invention.
Figure 6:
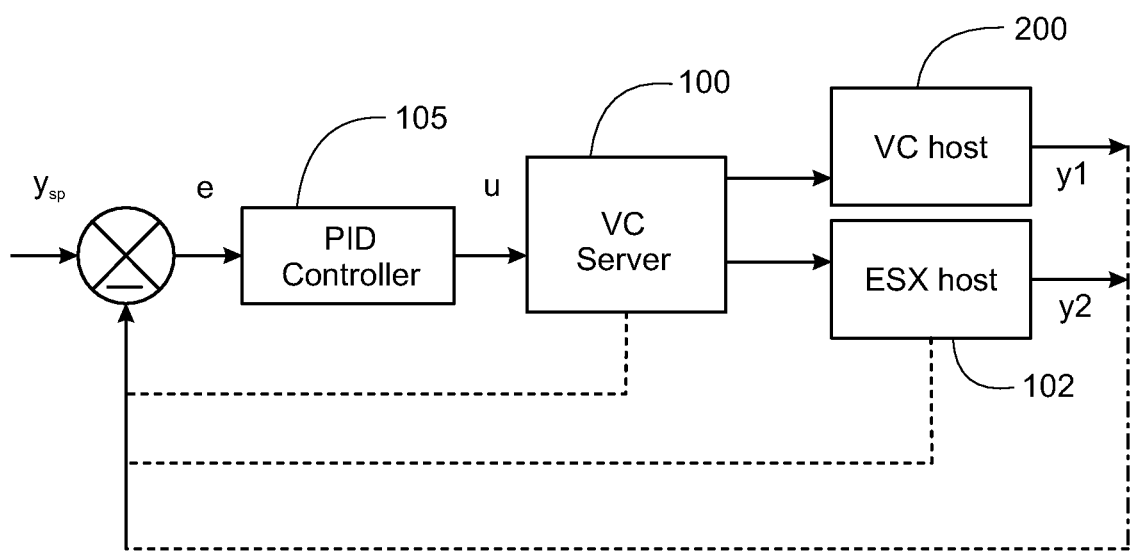
FIG. 6 is an alternative simplified schematic diagram illustrating the closed loop system architecture with a PID controller of FIG. 5 in accordance with one embodiment of the invention.

FIG. 5 is a simplified schematic diagram illustrating the employment of the PID control for VC servers in accordance with one embodiment of the invention. It should be appreciated that the VMWARE™ virtual center server 100 monitors and manages virtual machines, ESX™ hosts 102a-c, and data stores as shown in FIG. 5. Common VC operations for an ESX™ host include removing host, adding host, connecting host, disconnecting host, adding folder, and removing folder, and so on. For Virtual Machine 103a-c, common VC operations include clone VM, delete VM, VMotion, cold migrate, create template, deploy template, power on VM, power off VM, create snapshot, delete snapshot and so on. Similar to the challenges in the VUM server, the open loop scheduler for VC server 100 does not take into consideration the resource utilization of ESX host and VC host. The closed loop PID controller 105 addresses these issues. FIG. 6 is a simplified schematic diagram which shows the system architecture with a PID controller in accordance with one embodiment of the invention. In FIG. 6, PID controller 105 is in communication with VC server 100, which is in communication with both VC host 100 and ESX host 102. The information is fed back to PID controller 105 and processed in a manner similar to the functionality described above with reference to the Update Manger.

Figure 7:
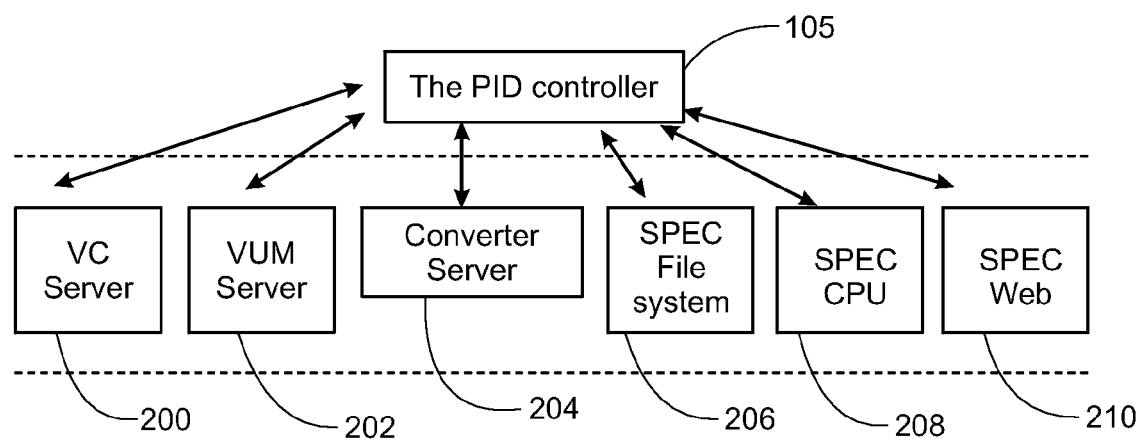
FIG. 7 is a simplified schematic diagram illustrating the PID controller being utilized with various benchmark tools in accordance with one embodiment of the invention.
Figure 8:
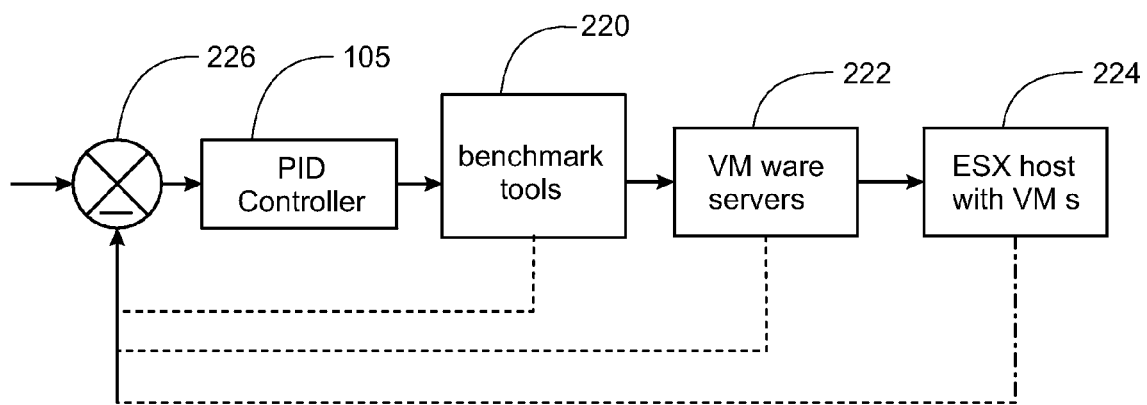
FIG. 8 is a simplified schematic diagram illustrating further details of the PID controller system of FIG. 7.

It should be appreciated that the embodiments described herein may be utilized with benchmark tools. For some benchmarks, engineers are required to manually adjust the driver rate of the benchmark tools in order to measure the throughput. This is time consuming and not very accurate. The PID controller described herein addresses these issues to provide more accurate measurements. As illustrated in FIG. 7, PID controller 105 communicates with various benchmark tools. The various benchmark tools include VC server 200, VUM server 202, converter server 204, SPEC file system 206, SPEC central processing unit 208, and SPEC web module 210. In FIG. 8, the PID controller is illustrated providing feedback for benchmark tools module 220 in accordance with one embodiment of the invention. In the control system, PID controller 105 receives feedback from benchmark tools module 220, VMWARE™ servers 222, and ESX host with virtual machines 224. It should be noted that the minus sign within feedback circle 226 that provides input to PID controller 105 indicates this is a negative feedback system. In one embodiment, the control variables can be the length of the working queue in the benchmark tools 220. In another embodiment, any variable from VMWARE™ servers, such as statistics from stat files, or any other operating system variables like CPU busy or I/O busy data, as well as any combination of data from these components may be employed.

The embodiments described above provide for a closed loop PID control system in order to allocate resources in a computing system. In on embodiment, the closed loop PID system may allocate resources based on one of the components of the PID system. That is depending on the availability of previous time interval data, the system is capable of functioning with the proportional (P) component (see Eqn. 11), the proportional and integral (PI) component (see Eqn. 17), or all three components (see Eqn. 10). As illustrated above, a set point parameter may be selected by a user and the PID system then converges to the set point through the embodiments described above. Furthermore, through the feedback, the PID system dynamically and adaptively adjusts the control variable.

It will be obvious, however, to one skilled in the art, that the present invention may be practiced without some or all of these specific details. In other instances, well known process operations have not been described in detail in order not to unnecessarily obscure the present invention.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

The invention claimed is:

1. A computer implemented method of controlling running of tasks using resources of a computing system comprising:
    determining a set point for utilization of at least one resource of the computing system in running the tasks, the set point being less than full allocation of the at least one resource;
    using a proportional-integral-derivative (PID) controller in determining whether the utilization of the at least one resource exceeds the set point;
    in response to a determination that the utilization does not exceed the set point, enabling a task to run on the computing system; and
    in response to a determination that the utilization exceeds the set point, delaying scheduling of running of tasks.

2. The method of claim 1 wherein the tasks are specific to a particular application, such that determining the set point includes selecting a maximum allocation of the at least one resource in execution of the particular application while enabling other applications to employ the remaining utilization for execution of other applications.

3. The method of claim 2 wherein the particular application is an update manager for providing updates to the computing system.

4. The method of claim 1 wherein using the PID controller includes providing a module at an entry point of the tasks to be run.

5. The method of claim 1 wherein using the PID controller includes establishing a proportional gain, an integral gain and a derivative gain, and further includes summing the proportional, integral and derivative gains to determine provide a control output for controlling scheduling of the running of the tasks.

6. The method of claim 1 wherein the PID controller is specific to scheduling tasks for a virtualization host server.

7. A non-transitory computer readable storage medium having program instructions for scheduling tasks using resources of a computing system, the program instructions being executable to provide processing comprising:
    establishing a set point for utilization of at least one resource of the computing system in running the tasks, the set point being less than full allocation of the at least one resource;
    using a proportional-integral-derivative (PID) controller in determining whether the utilization of the at least one resource exceeds the set point;
    in response to a determination that the utilization does not exceed the set point, enabling a task to run on the computing system; and
    in response to a determination that the utilization exceeds the set point, delaying scheduling of running of tasks.

8. The non-transitory computer readable storage medium of claim 7 wherein the tasks are specific to a particular application, such that determining the set point includes selecting a maximum allocation of the at least one resource in execution of the particular application while enabling other applications to employ the remaining utilization for execution of other applications.

9. The non-transitory computer readable storage medium of claim 8 wherein the particular application is an update manager for providing updates to the computing system.

10. The non-transitory computer readable storage medium of claim 7 wherein using the PID controller includes providing a module at an entry point of the tasks to be run.

11. The non-transitory computer readable storage medium of claim 7 wherein using the PID controller includes establishing a proportional gain, an integral gain and a derivative gain, and further includes summing the proportional, integral and derivative gains to determine provide a control output for controlling scheduling of the running of the tasks.

12. The non-transitory computer readable storage medium of claim 7 wherein the PID controller is specific to scheduling tasks for a virtualization host server.

13. A computer implemented method for allocating resources among servers of a system, comprising:
    specifying a proportional gain parameter at a first time interval;
    determining a first control error at the first time interval;
    allocating a resource of the enterprise system corresponding to a product of the proportional gain parameter and the first control error;
    determining an integral gain parameter at a second time interval;
    determining a second control error at the second time interval;
    determining a control output considering a product of the proportional gain parameter and the first control error, and a product of the integral gain parameter and the second control error;
    adjusting the resource allocation based on the control output;
    determining a third control error at a third time interval; and
    adjusting the resource allocation based on another control output considering the third control error;
    wherein the another control output is determined by summing 1) a product of a derivative gain parameter with the first control error, the second control error, and a third control error with 2) the second control error.

14. The method of claim 13, wherein the second control error and the third control error include data from a previous time interval.

15. The method of claim 13, further comprising:
    sampling a process variable at successive time intervals; and
    continuing the determining of a next control error for each of the successive time intervals.

16. The method of claim 15, further comprising:
    continuing to adjust the resource allocation for each successive time interval.

* * * * *